United States Patent [19]

Trefz et al.

[11] Patent Number: 5,770,050
[45] Date of Patent: Jun. 23, 1998

[54] FLOTATION APPARATUS

[75] Inventors: Michael Trefz, Heidenheim; Thomas Martin, Langenau; Hans-Dieter Dörflinger, Heidenheim, all of Germany

[73] Assignee: Voith Sulzer Stoffaufbereitung GmbH, Ravensburg, Germany

[21] Appl. No.: 505,019

[22] Filed: Jul. 21, 1995

[30] Foreign Application Priority Data

Jul. 22, 1994 [DE] Germany ................. 44 26 159.4

[51] Int. Cl.⁶ ............... B03D 1/24; B04C 3/00; B04C 3/06; D21C 5/04
[52] U.S. Cl. ............... 209/170; 209/725; 209/734; 210/221.2; 210/512.1; 162/4
[58] Field of Search ................. 209/170, 734, 209/725; 210/221.2, 512.1; 162/4

[56] References Cited

U.S. PATENT DOCUMENTS

| | | | |
|---|---|---|---|
| 4,186,094 | 1/1980 | Hellberg . | |
| 4,214,982 | 7/1980 | Pfalzer | 209/164 |
| 4,328,095 | 5/1982 | Ortner et al. | 209/169 |
| 4,378,289 | 3/1983 | Hunter | 209/211 |
| 4,560,474 | 12/1985 | Holik | 210/221.2 |
| 4,861,165 | 8/1989 | Fredriksson . | |
| 5,022,984 | 6/1991 | Pimley . | |
| 5,080,792 | 1/1992 | McGovern et al. | 210/512.1 |
| 5,131,980 | 7/1992 | Chamblee . | |
| 5,273,624 | 12/1993 | Chamberlain . | |
| 5,279,424 | 1/1994 | Britz . | |
| 5,330,655 | 7/1994 | Schweiss . | |
| 5,417,806 | 5/1995 | Matzke . | |
| 5,437,784 | 8/1995 | Meinecke et al. | 209/170 |
| 5,512,133 | 4/1996 | Markham . | |

FOREIGN PATENT DOCUMENTS

| | | |
|---|---|---|
| 23618/88 | 6/1989 | Australia . |
| 1335147 | 7/1989 | Canada . |
| 2120436 | 10/1994 | Canada . |
| 0 581 196 A2 | 2/1994 | European Pat. Off. . |
| 0 618 012 | 10/1994 | European Pat. Off. . |
| 27 38 782 | 11/1978 | Germany . |
| 30 05 815 | 8/1981 | Germany . |
| 3116 905 | 11/1982 | Germany . |
| 31 44 387 | 5/1983 | Germany . |
| 32 00 893 | 6/1983 | Germany . |
| 33 06 600 A1 | 8/1984 | Germany . |
| 36 34 903 | 4/1988 | Germany . |
| 37 41 843 | 6/1989 | Germany . |
| 3822454 | 8/1989 | Germany . |
| 4134607 | 4/1993 | Germany . |
| 43 14 507 | 6/1994 | Germany . |
| 2 114 178 | 8/1983 | United Kingdom . |

OTHER PUBLICATIONS

Search Report for European Patent Application No. 95110380.3; Date of Mailing Search Nov. 8, 1995.
Abstract of DE 31 16 905 from Derwent World Patent Index.
Abstract of DE 32 00 893 from Derwent World Patent Index.

*Primary Examiner*—Thomas M. Lithgow
*Attorney, Agent, or Firm*—Marshall, O'Toole, Gerstein, Murray & Borun

[57] ABSTRACT

An apparatus for selective particle flotation includes a static mixer connected to a flotation section in lieu thereof of the apparatus. The static mixer is disposed upstream of the flotation section in lieu thereof with respect to a direction of fluid flow through the apparatus. The static mixer mixes sludge with small gas bubbles. A flotation cyclone is disposed in an upstream portion of the flotation section in lieu thereof with respect to the direction of fluid flow through the apparatus. The flotation cyclone is the initial separation device through which the sludge flows.

18 Claims, 6 Drawing Sheets

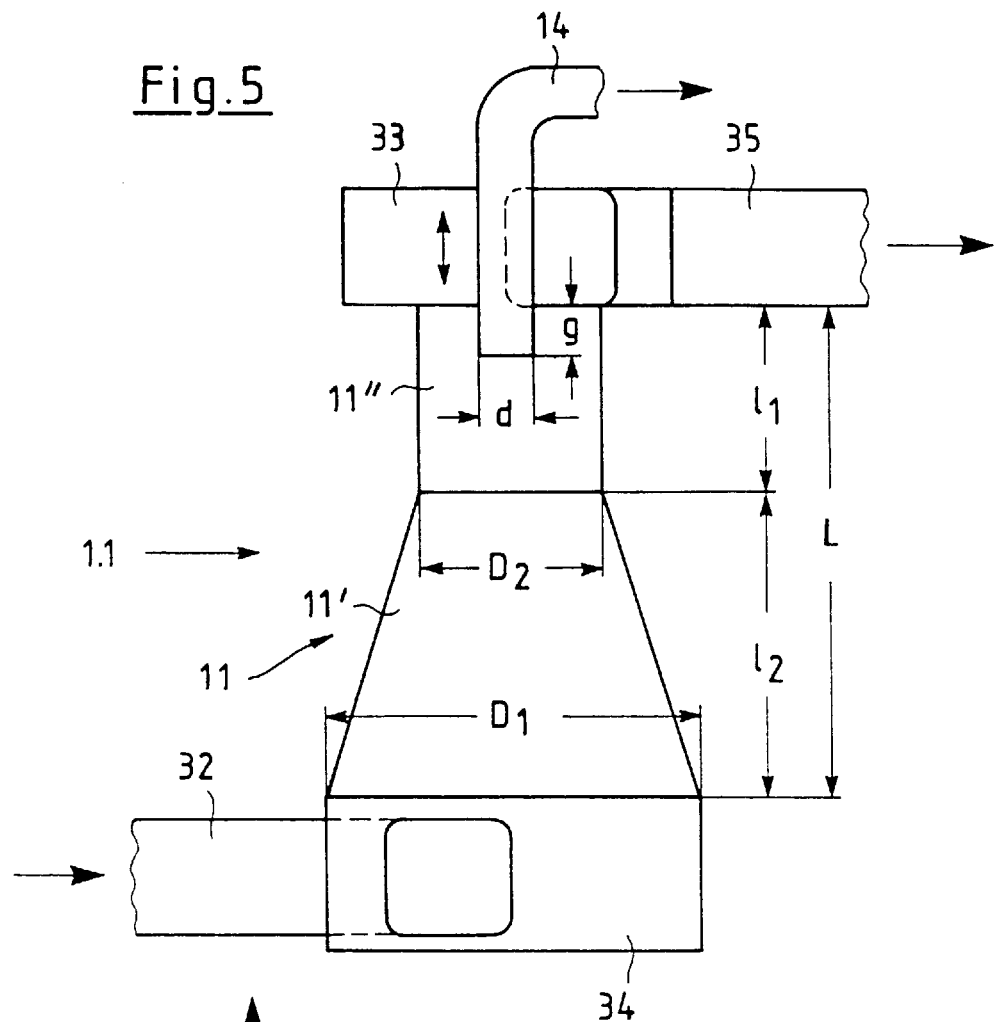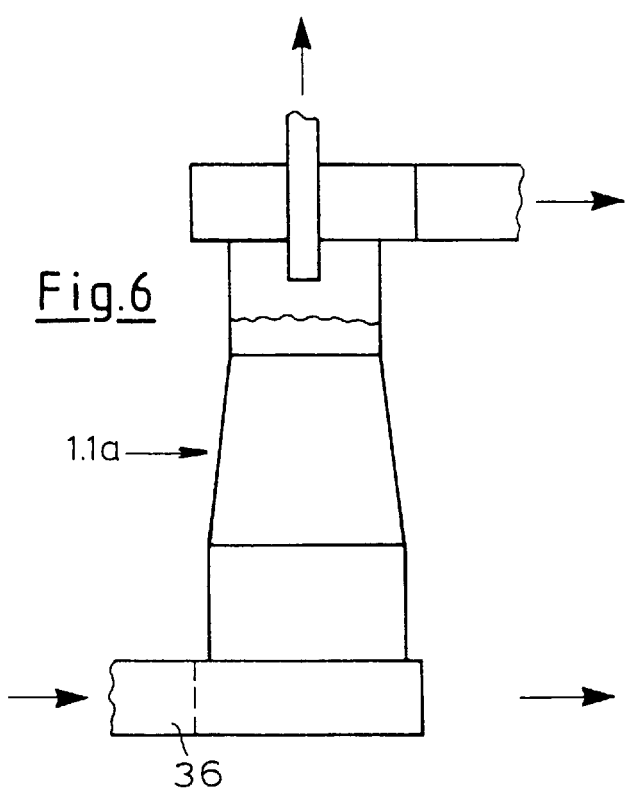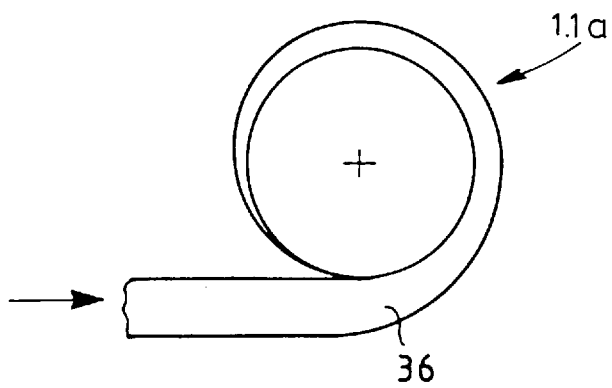

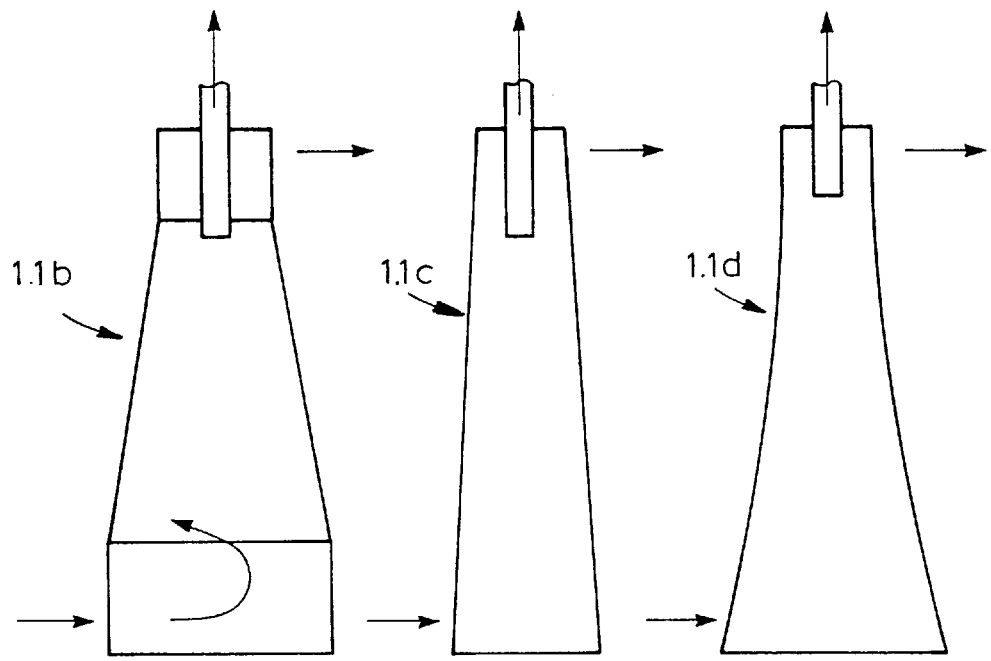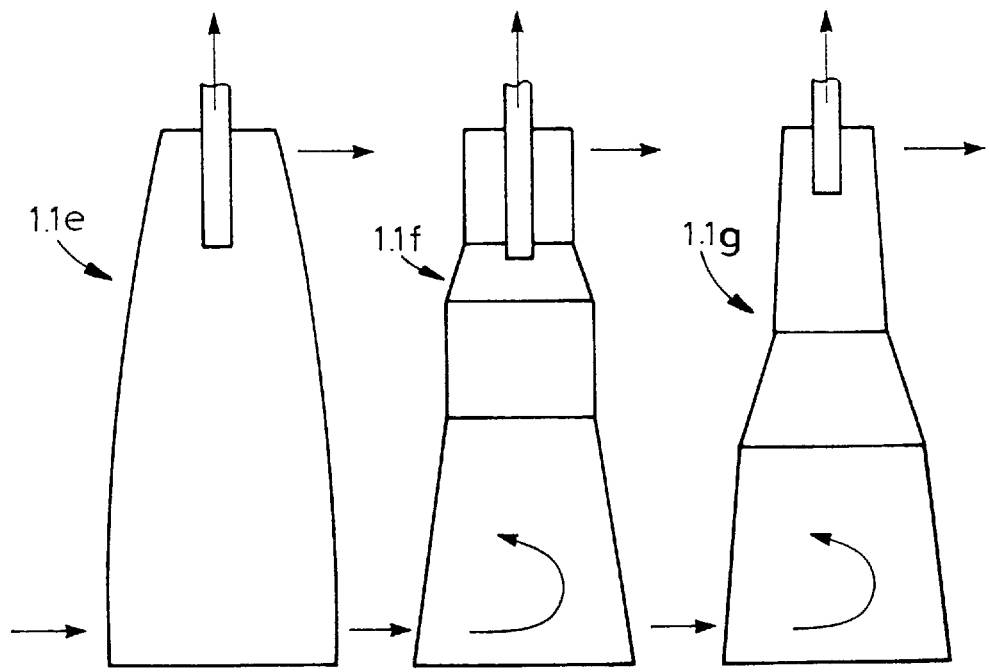

FLOTATION APPARATUS

BACKGROUND OF THE INVENTION

1. Field of the Invention

The invention relates to flotation devices and in particular to such devices which are used to selectively separate ink particles from waste-paper emulsions.

2. Description of Related Technology

Apparatus for the flotation of sludge having a static mixer disposed upstream of a flotation component of the apparatus with respect to the direction of fluid flow through the device, are known, for example, from DE 37 41 843 A1. This publication discloses that the static mixer is for mixing the flotation sludge with gas in the form of small bubbles. The static mixer is connected before (i.e., upstream with respect to a direction of fluid flow) the flotation component in order to intimately mix the flotation sludge with air bubbles in a favorable manner, the air bubbles being so small that the dirt particles attach to the bubbles. This is desirable, for example, when the sludge to be separated is a waste-paper suspension contaminated with printing ink. A problem that arises, especially during the flotation of a waste-paper suspension to remove printing ink particles, is the difficulty in achieving an extensive separation of the dirt or printing ink particles in as few steps (i.e., flotation cells) as possible. It is difficult to separate printing ink particles to a sufficiently equal degree due to their broad size spectrum since this corresponds to a number of different air bubble sizes. In general, a frequent occurrence is that the flotation foam that is separated first (i.e., a first flotation step), which should contain substantially only dirt particles, also entrains significant amounts of fiber, so that a flotation installation first purifies the sludge in a primary step, while in a secondary step, the foam produced in the primary step is treated further in order to recover the paper fibers.

SUMMARY OF THE INVENTION

It is an object of the invention to overcome one or more of the problems described above. It is also an object of the invention to provide a flotation installation in which an extensive purification of a fiber suspension, such as a waste paper suspension, can be achieved in as few steps as possible.

An apparatus for selective particle flotation according to the invention includes a static mixer connected to a flotation section in lieu thereof of the apparatus. The static mixer is disposed upstream of the flotation section in lieu thereof with respect to a direction of fluid flow through the apparatus. The static mixer mixes sludge with small gas bubbles. According to the invention, a flotation cyclone is in an upstream portion of the flotation section in lieu thereof with respect to the direction of fluid flow through the apparatus. The flotation cyclone is the initial separation device through which the sludge flows.

Other objects and advantages of the invention will be apparent to those skilled in the art from the following detailed description taken in conjunction with the drawings and the appended claims.

BRIEF DESCRIPTION OF THE DRAWINGS

FIG. 5 is an enlarged axial sectional view of the flotation cyclone of the flotation apparatus of FIG. 1.

FIG. 6 is a front and partial axial sectional view of a second embodiment of a flotation cyclone of the flotation apparatus according to the invention.

FIG. 7 is a top view of the cyclone of FIG. 6.

FIG. 8a is an axial sectional view of a third embodiment of a flotation cyclone of the flotation apparatus according to the invention.

FIG. 8b is an axial sectional view of a fourth embodiment of a flotation cyclone of the flotation apparatus according to the invention.

FIG. 8c is an axial sectional view of a fifth embodiment of a flotation cyclone of the flotation apparatus according to the invention.

FIG. 8d is an axial sectional view of a sixth embodiment of a flotation cyclone of the flotation apparatus according to the invention.

FIG. 8e is an axial sectional view of a seventh embodiment of a flotation cyclone of the flotation apparatus according to the invention.

FIG. 8f is an axial sectional view of an eighth embodiment of a flotation cyclone of the flotation apparatus according to the invention.

DETAILED DESCRIPTION OF THE INVENTION

According to the invention, a flotation cyclone is the first flotation (i.e. separation) device of a flotation system for removing particles, such as ink particles, from sludge (e.g., a waste paper suspension). The flotation cyclone is disposed upstream of a remainder of the flotation apparatus and downstream of a static mixer. In a preferred apparatus according to the invention, the flotation cyclone is designed to have a rising cyclone flow with an acceleration of about 5 to about 100 times gravitational acceleration, with foam being removed from a top portion of the cyclone.

The static mixer of a preferred apparatus according to the invention preferably has a channel in which very turbulent flow of the flotation sludge is created with the aid of protrusions on boundary walls of the mixer which define the channel. The protrusions are preferably in the form of elongate projections or ridges.

It is also preferable to design a secondary part or section of the flotation apparatus as a combination of a static mixer and a conventional flotation cell.

Furthermore, preferably, the static mixer boundary walls define a relatively flat channel having wide oppositely disposed boundary walls. Each wall has elongate projections and corresponding recesses which run parallel to one another, or have an angular deviation of at most about 8° from projection to projection or from groups of projections to groups of neighboring projections. Also, preferably, the elongate projections of one boundary wall cross in superposed relationship the elongate projections of the opposing boundary wall of the channel. Such a static mixing device is disclosed in DE 43 14 507 (corresponding to U.S. Pat. No. 5,437,784; issue date: Aug. 1, 1995). A flotation cyclone of suitable design is described in EP 94103747.5.

Several embodiments of flotation section in lieu thereof according to the invention, which primarily operate by gravity (gravitational acceleration) may be used in an apparatus according to the invention. As examples, reference is made herein to DE 31 44 387 and DE 30 05 815.

Figure 1:
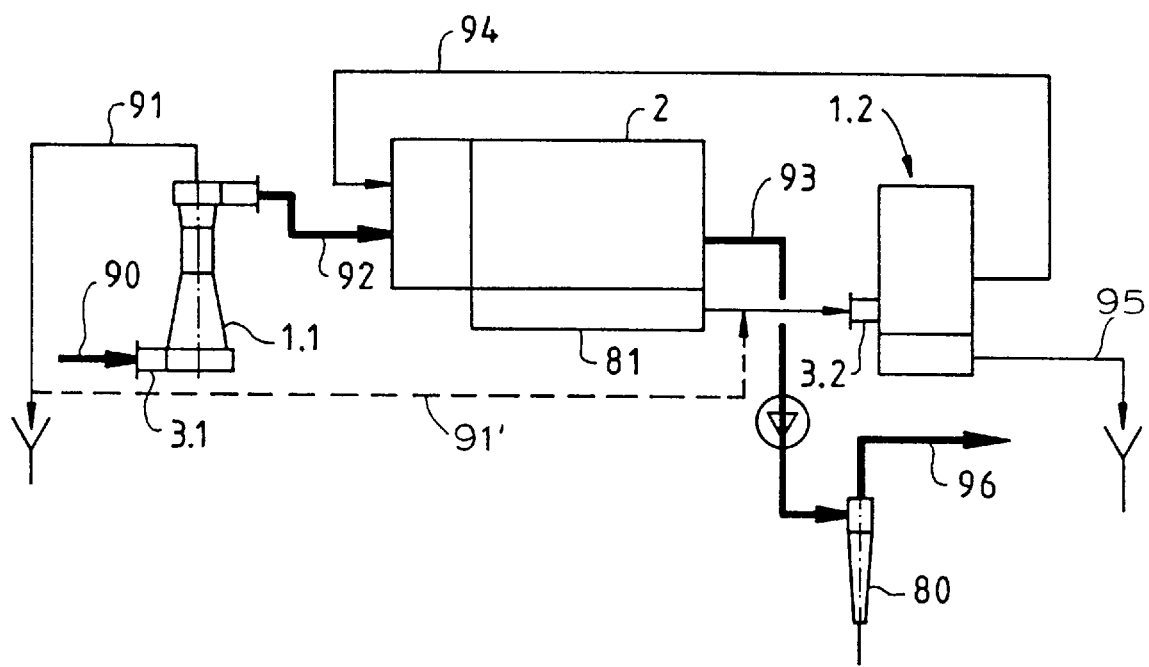
FIG. 1 is a schematic view of a flotation apparatus according to the invention having at least one static mixer and a flotation cyclone.

With respect to the drawing figures, FIG. 1 shows a flotation apparatus according to the invention having a cyclone 1.1 utilized as a first portion or step of a primary flotation apparatus section. The cyclone 1.1 and a connected downstream flotation device 2 constitute the primary flotation section of the apparatus. The flotation installation of device 2 designates flotation cells of a conventional design which essentially operate under gravitational force. A flotation portion 1.2 is disposed downstream of and is connected to the primary flotation section. The flotation portion 1.2 and a static mixer 3.2 make up a secondary flotation section of the inventive flotation apparatus. The main lines for transporting flotation of sludge through the apparatus are 90, 92, 93 and 96. Sludge flows into the static mixer 3.1 via the line 90 and then into the flotation cyclone 1.1. Flotation sludge flows out of the cyclone 1.1 via the line 92 and into the flotation device in lieu thereof 2. The flotation cells of the flotation device in lieu thereof 2 of the apparatus preferably are of a structure as given in the publications mentioned at the outset herein. Such flotation devices have a common foam channel 81 into which the flotation foam runs. This flotation foam is further purified in the secondary flotation portion which is designed here as a combination of the static mixer 3.2 and the conventional flotation cell 1.2. Inlet parts of the flotation cyclone 1.1 and the flotation portion 1.2 are the static mixers 3.1 and 3.2, respectively, which will be described in greater detail herein and are explained in detail in DE 43 14 507.

The flotation cyclone 1.1 has a central immersion tube which protrudes therefrom at a top thereof and which is not described herein in detail. The central immersion tube introduces the removed foam to a discharge line 91. The central immersion tube from the cyclone 1.1 is designated as 14 in FIG. 5 and is also shown in FIG. 6. Foam is removed from the flotation portion 1.2 via a discharge line 95.

The primary flotation section of an apparatus according to the invention, which performs a primary separation step of particles from sludge, thus includes the flotation cyclone 1.1 and the flotation device in lieu therefore or machine 2 having flotation cells of conventional construction. Here, the flotation cyclone 1.1 is connected before (i.e., upstream with respect to the direction of fluid flow through the apparatus) the flotation device in lieu thereof 2, as the first stage of flotation. Due to the special design of the individual components of the inventive apparatus, the entire apparatus permits the use of less steps for primary flotation, for example, only a total of 3 steps. Two of these steps are assigned to the conventional flotation cells of flotation device in lieu thereof 2. This is advantageously achieved because the flotation cyclone 1.1 has a higher separating efficiency than conventional flotation cells. However, above a certain particle size of the dirt (or ink) particles, namely about 150 $\mu$m, the separation in the cyclone 1.1 is not as good, so that, for such particles, the normal cells of the flotation device in lieu thereof 2 are used to separate such particles from the suspension.

The flotation cyclone 1.1 operates with a radial acceleration of between about 5 and about 100 times the acceleration of gravity. For example, if the flotation sludge is introduced into the static mixer 3.1 at a velocity of approximately 6 m/s, the sludge arrives into the cyclone 1.1 still having a velocity of about 1.5 m/s to 2 m/s.

Very large dirt particles (greater than about 400 $\mu$m) are separated very poorly by flotation so that, for such particles, a hydrocyclone 80 with very high centrifugal force usually provided by conventional hydrocyclones, is used. With respect to FIG. 1, sludge having large dirt particles flows from the flotation device in lieu thereof 2 through a line 93 into the hydrocyclone 80. Treated material flows out of the hydrocyclone 80 through a line 96.

The foam removed through the line 91 from the flotation cyclone (hydrocyclone) 1.1 of the primary flotation section of the apparatus is discarded or is introduced to the secondary section (3.2 and 1.2) according to a dashed line 91'. The foam removed through the line 95 from the secondary section is discarded. The good fraction of the secondary section is introduced through the line 94, preferably to flotation device in lieu thereof 2 of the primary section, i.e., at a location that is downstream of the flotation cyclone 1.1 with respect to the direction of fluid flow through the apparatus. This is preferable for the separation of the larger dirt particles. With respect to the removal of ink particles from a waste paper composition, in the flotation cyclone 1.1 of the primary section, all particles are separated which are no longer measurable with the image analyzer equipment, but have an essential strong influence on the degree of whiteness of the composition. Based on this core object of the invention, it becomes possible to reduce the total number of flotation cells or keep the number very small. This also includes a corresponding advantageous design of the flotation cyclone which will be described in further detail herein.

The static mixer 3.1 is preferably a mixing device having a relatively flat channel wherein strong turbulence in fluid flow through the channel is produced by protrusions in the form of elongate projections disposed on the oppositely facing substantially wide walls defining the channel. Thus, the static mixer ensures thorough mixing with air bubbles, keeping the size of the air bubbles relatively small. It is advantageous to cross the elongate projections of one wall with the projections of the opposite wall [as bars or cross pieces]. According to the invention, the static mixer may include a plurality of channels defined by substantially parallel, flat plates. Only a few, for example, two or three, parallel plates lying opposite to one another, are preferably used in a static mixer. There is considerable distance between the groups of elongate projections (i.e., ribs) of neighboring plates.

Figure 2A:
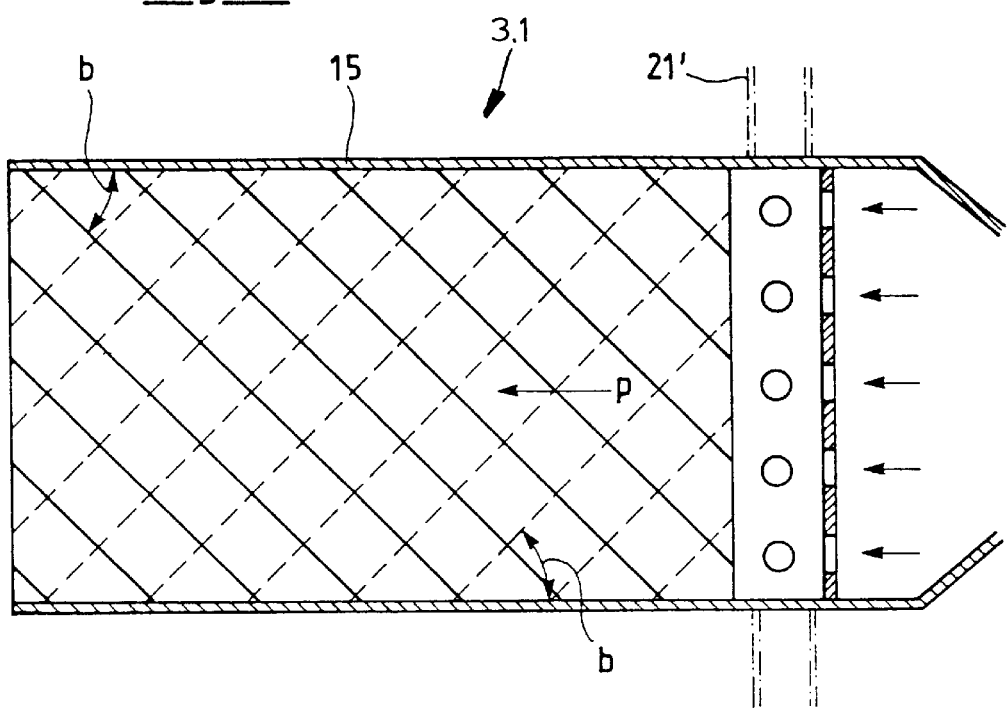
FIG. 2a is a transverse longitudinal-sectional view of the static mixer portion shown in FIG. 2.
Figure 2:
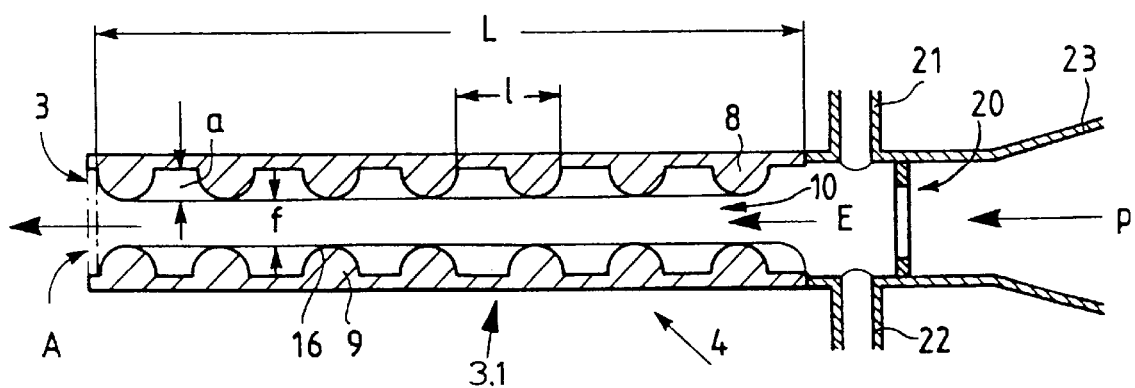
FIG. 2 is an enlarged longitudinal cross-sectional view of the static mixer portion of the flotation apparatus of FIG. 1.
Figure 3A:
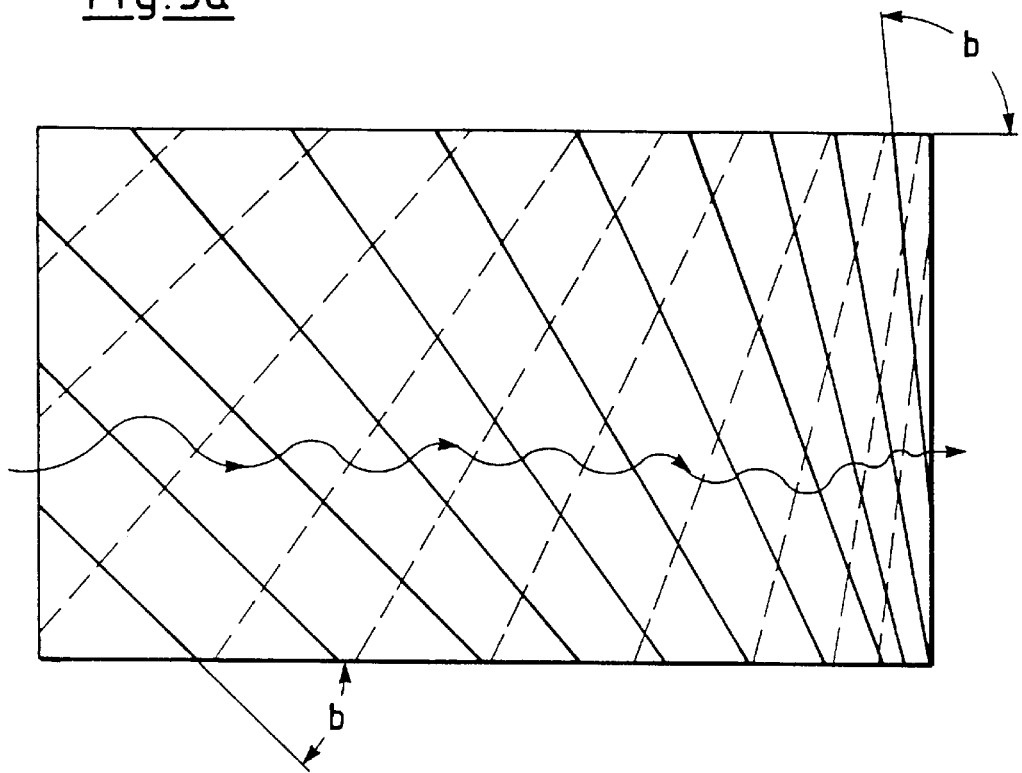
FIG. 3a is a longitudinal sectional view of a third embodiment of a static mixer portion of a flotation apparatus according to the invention in which the inclination of elongate projections increases steadily in the direction of fluid flow.

The static mixer, generally 3.1, utilized in a flotation apparatus according to the invention shown in FIG. 2 has two oppositely disposed injector plates 3 and 4 with elongate projections 8 and 9, respectively, delineating a flow channel 10 with an inlet end E and an outlet end A. In practice, the elongate projections are preferably designed as bars (cross pieces) and run at an angle b, starting at a side wall 15 (see FIG. 2a). The side wall 15 is parallel to the direction of fluid flow through the static mixer 3.1. The angle b may be between about 10° and about 90, preferably between about 20° and about 80, with respect to a direction of fluid flow p. However, this angle can increase from the inlet end E to the outlet end A, preferably between about 30° and about 90° (see FIG. 3a).

In the embodiment of a mixer shown in FIGS. 2 and 2a, the mixer has inlet channels 21 and 22 for the air, which are connected to an inlet channel 23 disposed behind (i.e., downstream of) a diaphragm 20. Alternatively, one or two inlet channels 21' (shown in phantom) may be provided at sides of the mixer for the introduction into the mixer of compressed air.

With respect to FIG. 2, a distance f between first and second planes that contact the tips, edges, or outer surfaces of the elongate projections of the walls 8 and 9, respectively, is in the following relationship to a height a of the elongate projections:

$$0.1 \leq f/a \leq 10, \text{ preferably } 1 \leq f/a \leq 10.$$

Figure 3:
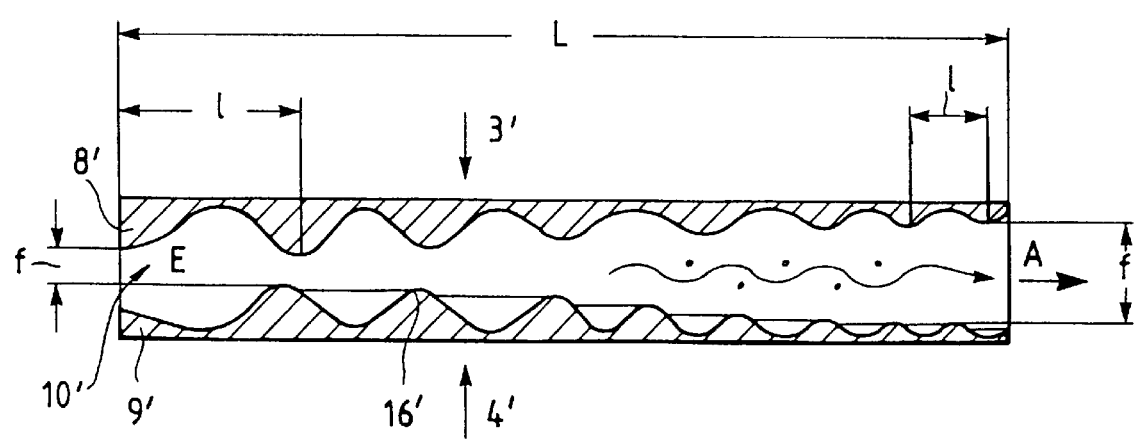
FIG. 3 is a longitudinal cross-sectional view of a second embodiment of a static mixer portion of a flotation apparatus according to the invention.

FIG. 3 illustrates a static mixer for use in a flotation apparatus according to the invention and shows two injector plates 3' and 4', each plate having elongate projections 8' and 9', respectively, which become increasingly smaller from the inlet end E to the outlet end A, while the distance f between planes touching neighboring elongate projections of the two plates becomes correspondingly larger toward the outlet end A. A wavelength 1 of the projections also decreases correspondingly from the inlet end E to the outlet end A. In contrast, the mutual distance between projections of the static mixer shown in FIG. 1 remains constant. The relationship between a total length L of the mixer and the mutual distance 1 between the tips of the projections can be, for example, in the following range:

$$5 \leq L/l \leq 100.$$

The ratio of the mutual distance 1 between tips 16 of the projections to the height a of the projections may lie in the following range:

$$l \leq l/a \leq 10.$$

In case of a wavy line [wave train] formed by projections 3' and 4', the length 1 is a wavelength λ. In practice, here, the value of the height or maximum height of the projections 8, 9 and 8', 9', respectively, lies between about 4 mm and about 20 mm.

Figure 4:
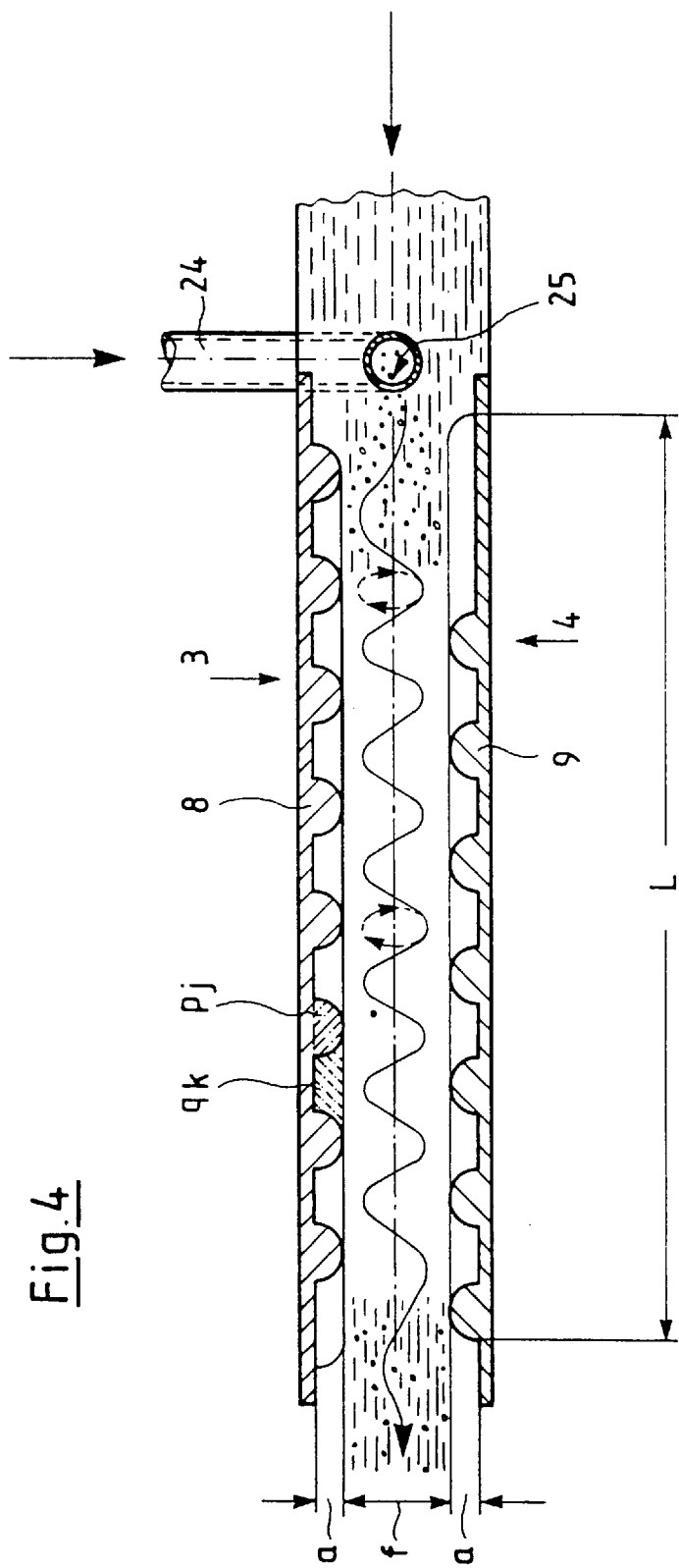
FIG. 4 is a longitudinal sectional view of a fourth embodiment of a static mixer portion of a flotation apparatus according to the invention having an alternative inlet device.

FIG. 4 shows a mixer for use in a flotation apparatus of the invention that is similar to the mixer embodiment shown in FIG. 1. The mixer of FIG. 4 differs from the mixer of FIG. 1 in that the air inlet is designed differently. An inlet tube 24 has outlet openings 25 for air entry into the mixer.

The number of plates and thus the number of channels formed by the plates are preferably kept relatively low to provide cost-effective production of the static mixer. In general, at most four parallel plates (with three channels formed between them) should be sufficient for a static mixer in a flotation apparatus according to the invention. From this point of view, a static mixer embodiment having only two plates defining one channel therebetween is preferred.

It has already been explained that certain forms of elongate projections are preferably used. Furthermore, the cross-sectional areas of the projections in relation to the longitudinal axis of the channels or plates, is important, i.e., the direction between the inlet and outlet of the channels. If the magnitude of the cross-sectional area of the projections is designated $p_j$ and the area of the cross-section of the intermediate spaces between neighboring projections, taken in the same direction, is designated as $q_k$ (see FIG. 4), then the ratio of $p_j/q_k$ is preferably selected to be at least about 0.5. Considering the entire plate, this limiting value is also chosen for the ratio of the sum of the cross-sectional areas of all protrusions to the sum of the cross-sectional areas of all intermediate spaces. Furthermore, it is advantageous when the sum of all these cross-sectional areas per plate and channel (that is, per side of the plate) is greater than 4000 mm²/m. The minimum distance between two neighboring projections of neighboring plates is at least about 5 mm and is preferably about 8 mm.

It has been found that fluid flow velocity, based on the inner cross-sectional area of a particular channel (width of the channel times distance f between the projections), must be greater than 3 m/s and preferably in a range of about 6 m/s to about 10 m/s. The plate distance mentioned herein also serves to keep the pressure loss relatively small, which should not exceed 1 bar, if possible.

The distance between the plates has a strong influence on the size spectrum of the air bubbles produced in the mixer. With respect to the separation of ink particles from a waste paper suspension, depending on the type of fiber and on the size of the ink particles, different distances are necessary in order to obtain optimum removal of the printing ink. In case of a broad size spectrum of the ink particles, it is advantageous to produce corresponding air bubble spectra in several successive mixing channels with different distances f. It is advantageous to first produce large air bubbles and subsequently smaller air bubbles. On the other hand, this means that the distance f between the elongate projections of the plate become smaller and smaller from plate-pair or plate group to the next plate group. Preferable values of f lie between about 10 mm and about 50 mm and for a between about 4 mm and about 20 mm.

It has already been pointed out herein that in order to achieve a very good cleaning effect, attention also must be devoted to the design of the flotation cyclone. Namely, in the flotation cyclone, the fine particles must be separated to a large extent, because the fine particles become attached to the very fine air bubbles. In a flotation cyclone according to the invention, these fine particles and bubbles increasingly flow to the turbulent core formed in the flotation cyclone, so that a higher degree of purification is achieved with regard to these fine particles. As already stated herein, as a result, the total number of flotation process steps (and thus the number of flotation cells) can be reduced significantly with a corresponding cost advantage.

Preferred embodiments of flotation cyclones for use in the inventive flotation apparatus are further explained herein with respect to FIGS. 5–8f.

FIG. 5 shows the flotation cyclone container 1.1 having a middle, i.e., centrally located separator part 11 where the separation of air and suspension is performed. The part 11 includes a conical part 11' in the form of a truncated cone and a cylindrical part 11" mounted onto the conical part 11'. A tangential inlet flow portion 32 is connected to a cylindrical inflow part 34 of the cyclone. The part 34 is attached to the part 11'. A discharge part 33 of the mixer which is attached to the part 11" is also cylindrical and has a tangential discharge flow portion 35. An immersion tube 14 penetrates into a top of the cylindrical part 11" of the separator part 11 at a section g which is preferably 0.8–1.2 times an outside diameter d of the immersion tube 14. The ratio of the lengths (heights) of the conical part 11' and of the cylindrical part 11" of the separator part 11, $l_1/l_2$ can be chosen to range between about 0.2 and about 1. A total length L of the separator part 11 can be about 2.5 to about 3.5 times a diameter $D_2$ of the cylindrical part 11". The ratio between the largest (maximum) diameter $D_1$ and the smallest (minimum) diameter $D_2$ of the separator part 11 is preferably between about 1.2 and about 3. A total length of the separator part 11 is preferably between about 0.8 m and about 2.0 m in practice. The latter data are also valid for other types of construction of these flotation devices which are shown in the other drawing figures.

The mode of operation of a cyclone according to the invention is advantageous because a very high centrifugal acceleration occurs in the upper part 11" of separator part 11 having the smaller diameter, so that small bubbles will rise and the dirt (or ink) particles attached to them will be separated. However, the velocity must be adjusted in such a way that printing ink particles that adhere to the bubbles will not be separated by overly high shearing forces.

Supported by the axial flow component of the suspension from down upwards, foam is transported through the cyclone 1.1 in the direction of the immersion tube 14 (the degassing opening). As a result of the internal excess pressure, foam is continuously removed from the cyclone. The embodiment of the cyclone described with respect to FIG. 5 having a discharge part 33 is preferably utilized with a flotation apparatus of the invention because, after passage through the narrow part 11' of the separator part 11, there is an increase in diameter of the cyclone and the suspension flowing through the part 11 is slowed down. Preferably, the discharge part 33 has a diameter that is at least about 10% greater than the smallest diameter $D_2$ of the separator part 11. Similar discharge parts are preferably used with other cyclone embodiments, such as those shown in FIGS. 8a–d. Preferably, the immersion tube 14 has bores located both in the separator part 11" and also the outlet part 33 in order to achieve post-degassing with utilization of secondary flow. The velocity of the suspension-air mixture flowing into the cyclone 1.1 is preferably between about 0.5 m/s and about 5 m/s and the axial velocity of fluid through the cyclone is preferably between about 0.1 m/s and about 1 m/s.

Another embodiment of a flotation cyclone for use with a flotation apparatus of the invention is shown in FIGS. 6 and 7. The flotation cyclone 1.1a of FIGS. 6 and 7 has an inlet flow 36 that is in the form of an inlet spiral.

FIGS. 8a–8f show other embodiments of flotation cyclones for use with a flotation device according to the invention. FIG. 8a shows a flotation cyclone 1.1b having a very small cylindrical upper part. FIG. 8b shows a flotation cyclone 1.1c designed as an uninterrupted truncated cone. FIGS. 8c and 8d show flotation cyclones 1.1d and 1.1e, respectively, having a concave form and a convex form, respectively. FIGS. 8e and 8f show flotation cyclones 1.1f and 1.1g, respectively, having combinations of cylindrical and conical sections.

The foregoing detailed description is given for clearness of understanding only, and no unnecessary limitations should be understood therefrom, as modifications within the scope of the invention will be apparent to those skilled in the art.

We claim:

1. In an apparatus for selective particle flotation in at least two separation steps, the apparatus comprising a static mixer connected to a primary flotation section for a first separation of particles from sludge, said static mixer having a gas inlet and being disposed upstream of the primary flotation section with respect to a direction of fluid flow through the apparatus, said static mixer for mixing sludge with small gas bubbles, the improvement wherein the primary flotation section comprises a flotation cyclone disposed downstream of the mixer and upstream of a remainder of the primary flotation section with respect to the direction of fluid flow through the apparatus, said cyclone being an initial separation device through which the sludge flows and further comprising a tangential inlet for introduction of a sludge and gas mixture from the static mixer, an outlet for cleaned sludge, a central immersion pipe for removal of foam which consists of particles clinging to gas bubbles, means for providing a rising flow of about 5 to about 100 times gravitational acceleration and a foam discharge line disposed at a top thereof;

said at least two separation steps further comprises a conventional flotation device connected to receive cleaned sludge from the cleaned sludge outlet of said flotation cyclone; and said flotation cyclone including means for achieving a high separation efficiency for particles under 150 micrometers and a lesser separation efficiency for particles over 150 micrometers, and said conventional flotation device includes means for achieving a good separation efficiency for particles over 150 micrometers.

2. The improvement of claim 1 wherein the static mixer comprises inner walls defining at least one channel, said inner walls having elongate projections.

3. The improvement of claim 1 wherein said apparatus further comprises a secondary flotation section connected to and disposed downstream of the primary flotation section with respect to the direction of fluid flow through the apparatus, said secondary flotation section for treating at least one of foam formed in the flotation device of the primary flotation section and foam formed in the entire primary section.

4. The improvement of claim 3 wherein said static mixer is a first static mixer and further comprising a second static mixer disposed in the secondary flotation section, said secondary flotation section further comprising a conventional flotation cell serving as a separation device.

5. The improvement of claim 3 wherein said first static mixer is directly attached to an input part of the flotation cyclone.

6. The improvement of claim 5 wherein an outlet for purified sludge flowing out of said secondary section is connected to an inlet of the primary section, said primary section inlet disposed downstream of said flotation cyclone.

7. The improvement of claim 1 wherein said static mixer comprises first and second substantially flat opposing boundary walls, said walls defining, at least in part, a flow channel, each of said walls having elongate projections defining a plurality of ridges with adjacent ridges oriented with respect to one another ranging from being parallel to deviating at most 8° with respect to one another, the elongate projections of the first wall crossing in superposed relationship the elongate projections of the second wall.

8. The improvement of claim 7 wherein an angle of inclination of the elongate projections with respect to the direction of fluid flow through the flow channel is between about 10° and about 85°.

9. The improvement of claim 7 wherein an angle formed between the elongate projections and the direction of fluid flow through the channel increases steadily from projection to projection to define an overall angle increase of from about 20° and about 85° from an inlet end to an outlet end of the flow channel.

10. The improvement of claim 7 wherein an angle formed between the elongate projections and the direction of fluid flow through the channel increases steadily between related groups of consecutive projections to define an overall angle increase of from about 20° and about 85° from an inlet end to an outlet end of the flow channel.

11. The improvement of claim 7 wherein the distance between two planes tangent to neighboring projections of the opposed boundary walls is at least about 8 mm.

12. The improvement of claim 2 wherein a ratio of a cross-sectional area of an elongate projection to a cross-sectional area of an intermediate space between adjacent elongate projections disposed on the same wall in the direction of fluid flow is at least about 0.5:1.

13. The improvement of claim 12 wherein the sum of the cross-sectional areas of the elongate projections added to the sum of the corresponding cross-sectional areas of the intermediate spaces between the adjacent elongate projections disposed on the same wall is at least about 4000 mm$^2$/meter length of the wall, said wall length being measured from an inlet end to an outlet end of the wall.

14. The improvement of claim 1 wherein the flotation cyclone has a separator part disposed in a central portion of the cyclone, said separator part narrowing toward a top thereof at least one of gradually, uniformly, and in a step-wise manner, a diameter ratio ($D_1/D_2$) of a largest diameter ($D_1$) of the separator part to a smallest diameter ($D_2$) of the separator part is between about 1.2 and about 3.

15. The improvement of claim 14 wherein the flotation cyclone has in immersion tube extending thereinto, said immersion tube having an outside diameter (d), a ratio of the diameter (d) of the immersion tube to the smallest diameter ($D_2$) of the separator part ($d/D_2$) is between about 0.3 and about 0.5.

16. The improvement of claim 14 wherein the flotation cyclone has an immersion tube extending thereinto, said immersion tube having a depth (g) extending into the separator part that is about 0.8 to about 1.2 times an outside diameter (d) of the immersion tube.

17. The improvement of claim 14 wherein the flotation cyclone has a cylindrical inlet part having a diameter which is at least equal to the largest diameter ($D_1$) of the separator part.

18. The improvement of claim 14 wherein the flotation cyclone has a discharge part having a diameter that is at least about 10% greater than the smallest diameter ($D_2$) of the separator part.

* * * * *